Jan. 24, 1933.  W. SEIZ  1,895,349

REGULATION OF ASYNCHRONOUS MACHINES

Filed Jan. 16, 1930

Inventor:
Walter Seiz,
by Charles E. Mullen
His Attorney.

UNITED STATES PATENT OFFICE

WALTER SEIZ, OF BADEN, SWITZERLAND, ASSIGNOR TO GENERAL ELECTRIC COMPANY, A CORPORATION OF NEW YORK

REGULATION OF ASYNCHRONOUS MACHINES

Application filed January 16, 1930, Serial No. 421,235, and in Germany January 18, 1929.

The principal object of my invention is the regulation of asynchronous machines so as to prevent rapid fluctuations in the power demands from the main generating supply system. Two supply systems having the same or different frequencies are often tied together by a so-called frequency converter set consisting of two main machines respectively connected to the two supply systems. It is often desirable to maintain a constant power demand on one system and have the other system absorb the momentary fluctuations in power demands of both systems and the accomplishment of this desirable result is an additional object of my invention.

It is well known to those skilled in the art that both the slip and the rotor voltage across the collector rings of the usual wound rotor asynchronous machine will vary with its load and therefore will vary with its rotor current. If at every speed of the asynchronous machine a voltage component is impressed on the collector rings which is equal and opposite to the rotor voltage existing at the collector rings then an additional voltage component impressed on the collector rings will vary the rotor current and hence will vary the primary current of the machine independently of the slip. The asychronous machine can then be made to supply or absorb the momentary load fluctuations of the load circuit it is connected to by adjusting the direction of this additional voltage component so as to cause the asychronous machine to operate either as a generator or as a motor and by regulating the strength of this component so as to vary the strength of the current flowing through the asynchronous machine. The main object of my invention is to provide a regulating set which will automatically impress suitable voltage components on the collector rings of the usual wound rotor asynchronous machine so as to cause it to operate either as a motor or as a generator so as to supply or absorb the momentary load fluctuations of the load circuit.

My invention will be best understood from the following description when considered in connection with the accompanying drawing while the features of my invention which are believed to be novel and patentable are pointed out in the appended claims.

Figure 1:
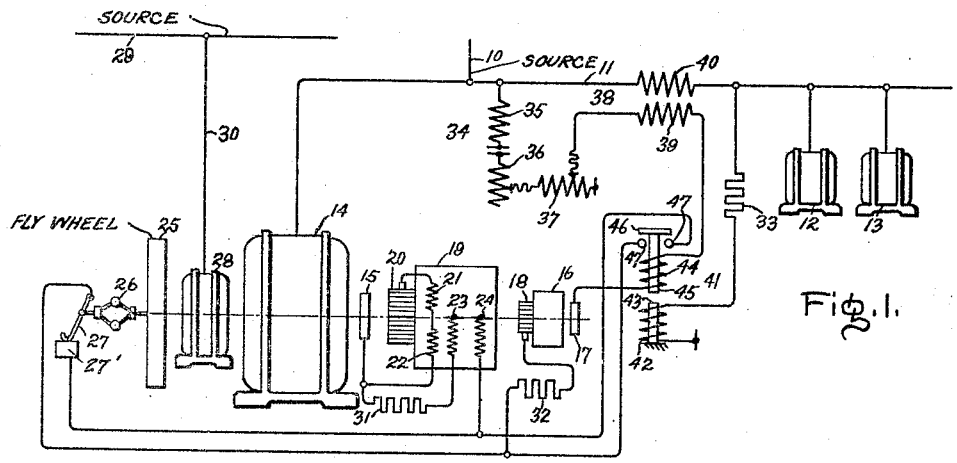
Figure 2:
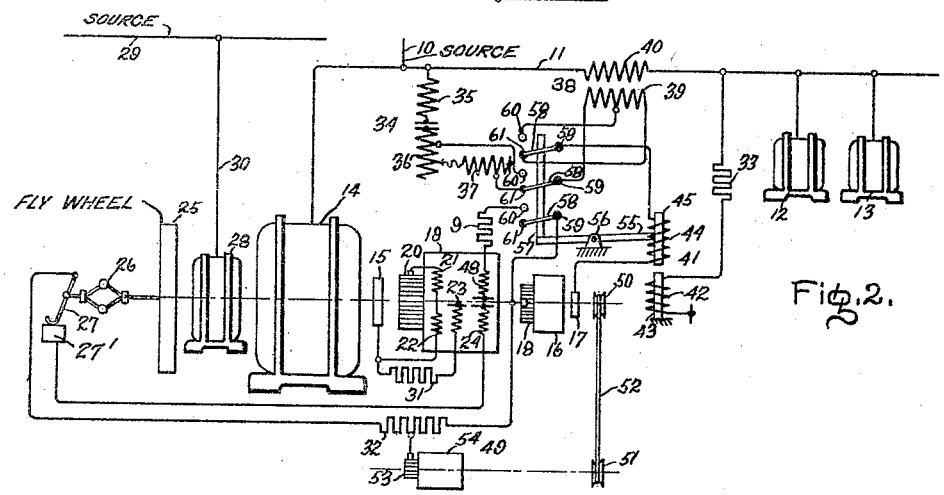

Fig. 1 represents an embodiment of my invention where the regulating apparatus consists of two transformers, a commutator type frequency changer, a regulating machine, a speed responsive switch to open one of the exciting winding circuits of the regulating machine at a predetermined speed and switching means to close the said circuit under certain conditions although such predetermined speed has been reached. Fig. 2 represents a modification of my invention where the regulating machine has an additional exciting winding which is energized only at certain predetermined conditions and a so-called locking device to make the main exciting winding substantially ineffective under certain predetermined conditions. To simplify the drawing I have represented it with single connecting leads but it is obvious that my invention is applicable to any number of connecting leads or any number of phases.

In Fig. 1 which represents a preferred embodiment of my invention, 10 represents a source of alternating current connected to the load circuit 11 to which there may be connected motors or generators represented by 12 and 13. To the circuit 11 there is connected the asynchronous machine 14 having a rotating secondary winding connected to the collector rings 15. A frequency changer represented by 16 has collector rings 17 and a commutator 18. A regulating machine 19 has a rotating armature connected to the commutator 20 and four stator windings represented by the compensating winding 21, the series exciting winding 22, the auxiliary exciting winding 23 and the main exciting winding 24. A fly-wheel is represented by 25, and 26 represents a speed responsive switch having a movable switch blade 27 and a stationary contact block 27'. Also 28 may represent a mechanical load driven by 14, or 28 may represent a direct or alternating current generator supplying power to the load circuit 29 through the lines 30, or 28 may represent a synchronous or asynchronous machine which is to act as one element of a frequency converter set, in which case 14 will be the other element and 29 will represent another source of alternating current whose frequency may be the same or different from that of source 10. The asynchronous machine 14 is represented as directly coupled to 16, 19, 25, 26 and 28 and by having the same number of poles in 14 and 16 the collector rings 17 may be supplied with currents having the frequency of the source 10 and the current taken from the commutator 18 will have the same frequency as the secondary currents of the asynchronous machine 14. It will be obvious to those skilled in the art that 16 may be driven at speeds which are directly proportional to that of 14 providing they have the proper ratio of pole numbers. If desired, 25, 26 and 28 may be separately driven at speeds which are directly proportional to that of 14, and 19 may be separately driven at speeds that are not directly proportional to that of 14. Three resistances are represented by 31, 32 and 33. A power transformer represented by 34 has a primary winding 35 and two secondary windings 36 and 37 arranged in quadrature relation to each other. A series transformer represented by 38 has a secondary winding 39 and a primary winding 40 so connected that it carries either the full value or a proportionate value of all the current flowing in the load circuit 11 less the current flowing in the asynchronous machine 14. A control device represented by 41 has a solenoid 42 with a stationary core 43 and another solenoid 44 with a movable core 45 which carries a metallic strip 46 suitable for short-circuiting the terminals 47 when in contact with them.

To give a simple and concrete illustration of the operation of my invention I make the following simplifying assumptions. The load circuit 11 is the only load circuit connected to the supply source 10, the machine 28 represents a mechanical load of varying magnitude driven by 14, whereas 12 and 13 represent two motors driving loads of varying magnitude. It is desired to maintain a constant output of 1000 kw. from the supply source 10 and not to exceed a speed of 1500 R. P. M. which is considered as the safe speed of the fly-wheel 25.

A brief description of the operation follows: The speed responsive switch 26 which is connected in series with the circuit of the exciting winding 24 will be adjusted to open that circuit at a speed of 1500 R. P. M. The resistances 31 and 32 are made so large in comparison to the reactances of the exciting windings 23 and 24 with which they are respectively connected in series that the currents in these windings are substantially independent of the frequency variations and are substantially directly proportional to their respective impressed voltages. The compensating and series windings 21 and 22 are to balance armature reaction and voltage drop in the machine 19. The exciting winding 23 is designed so that the flux produced by it will induce a voltage component in the regulating machine 19 which at every speed of the machine 14 is equal and opposite to the induced secondary voltage existing at the collector rings 15. As this voltage component is always impressed on the collector rings 15 it follows from my previous discussion that by regulating the strength and direction of an additional voltage component impressed on the collector rings 15 I can regulate the secondary current and hence regulate the primary current of the asynchronous machine 14 independently of its slip and also determine whether this primary current is to be power input to the machine 14 or power output from the machine 14. This additional voltage component is produced by the flux resulting from the current in the exciting winding 24. The object of the transformer 34 is to cause an exciting current to flow through the winding 24 which will induce a voltage component in 19 which being impressed on the collector rings 15 will cause a power input to 14 and I will term this exciting current $c'$. The active and reactive components of $c'$ may be regulated manually or automatically to desired values by suitably adjusting the quadrature windings 36 and 37 respectively although in usual cases they are adjusted to give definite values and are not disturbed thereafter unless conditions warrant a change. The object of transformer 38 is to cause an exciting current to flow through the winding 24 which will induce a voltage component in 19 which, being impressed on the collector rings 15, will cause a power output from 14 and 12 and 13 require power from source 10, and I will term this exciting current $c''$. The power output from 14 will be proportional to the power demand of 12 and 13 since the primary 40 of the transformer 38 carries all or a proportionate part of the current flowing to 12 and 13. The transformer 38 has a high magnetic reluctance so that when the secondary windings of the transformers 34 and 38 are connected in series the current flow due to the secondary of transformer 34 will have substantially no effect on the voltage induced in the secondary 39 and it follows that the voltage induced in the secondary 39 will be substantially directly proportional to the current flow in 40. By suitably designing the secondaries and connecting their proper ends together for the series connection the resulting current flow to the collector rings 17 will be the difference of the two secondary currents and therefore the exciting current in winding 24 will be $c''' = c' - c''$ when 12 and 13 require power input.

Now assume that winding 36 is adjusted to require a power input of 1000 kw. into 14, the load 28 requires 300 kw. input to machine 14 to drive it and the total load on motors 12 and 13 requires 600 kw. input to them. It is obvious that the secondary of transformer 34 will tend to send an exciting current into winding 24 calling for 1000 kw. input to 14 whereas the secondary of transformer 38 will tend to send an exciting current into winding 24 calling for 600 kw. output from 14. It follows that the resulting flux produced by the current $c'''$ in winding 24 will cause a power input of 400 kw. to 14 which then operates as a motor and since it requires only 300 kw. to drive 28 the surplus 100 kw. causes 14 to accelerate in speed and the fly-wheel 25 absorbs this 100 kw. and stores it in the form of kinetic energy. It follows that 1000 kw. will be supplied by source 10. Now assume that the load on 28 increases so as to require 400 kw. input to machine 14 to drive it, then the motor action of 14 is just able to supply that load and there is no further increase or decrease in the speed of 14. Now assume that the load on 28 increases to require 500 kw. input to machine 14 to drive it, then the motor action of 14 is unable to drive 28, the speed of 14 decreases and the fly-wheel 25 gives up kinetic energy to the value of 100 kw. and thus 28 is driven by the combined motor action of 14 and 25 and the output of 10 remains 1000 kw. To give examples of the operation with variations in the loads on motors 12 and 13 I will again make my previous assumption that winding 36 is adjusted to require 1000 kw. input to 14, the loads on motors 12 and 13 require 600 kw. input to them and 28 requires 300 kw. input to machine 14 to drive it and hence the surplus 100 kw. is absorbed by the fly-wheel 25 due to acceleration in speed. Now assume that the loads on motors 12 and 13 increase to require 700 kw. input to them, then the total input to 14 will be 1000−700=300 kw. which is just able to drive 28 and there is no increase or decrease in speed. Now assume that the loads on motors 12 and 13 increase to require 800 kw. input to them, then the total input to 14 will be 1000−800=200 kw. and since 28 requires 300 kw. to drive it the motor action of 14 is unable to drive that load, the speed of 14 decreases and the fly-wheel 25 gives up kinetic energy to the value of 100 kw. and thus 28 is driven by the combined motor action of 14 and 25. If the loads on motors 12 and 13 increase to 1000 kw. there will be no power input to or power output from 14 and the speed of 14 will decrease so that the fly-wheel 25 gives up kinetic energy to the value of 300 kw. to drive the load 28. Now assume that the loads on motors 12 and 13 increase so as to require 1100 kw. to drive them, there will be a reversal in the relative instantaneous direction of the current in the exciting winding 24 since there is a demand for power input of 1000 kw. to 14 and power output of 1100 kw. from 14 thus requiring a net power output of 100 kw. from 14. It follows that the speed of 14 will decrease so that the fly-wheel 25 gives up kinetic energy to the value of 400 kw. so as to drive the load 28 which requires 300 kw. and to drive 14 as a generator to give a power output of 100 kw. It is evident that throughout all these load variations the output of source 10 remained constant at 1000 kw. since I assumed that 11 is the only load circuit connected to 10. If 10 has more than one load circuit then each circuit can be similarly regulated by a separate regulating set or two or more load circuits may be regulated by one regulating set by providing the transformer 38 with two or more primaries 40 suitably arranged. The adjustment of winding 37 regulates the reactive component of the excitation current $c'$, thus regulating the reactive current in the secondary of 14 which in turn varies the reactive current in the primary of 14, thus permitting power factor regulation of 14.

The principle of operation of my invention will not be affected if either 12 or 13 or both 12 and 13 are generators supplying power to 11, because if the net result of the operation of machines 12 and 13 is to furnish power to 11, then there is a reversal of the relative instantaneous direction of the current component $c''$ as compared to its direction when the net result of the operation of machines 12 and 13 was to take power from 11. The reversal of the component $c''$ causes it to require a power input to 14 instead of a power output from 14 and the fly-wheel 25 will now absorb or supply the load variations in 28 and the variations in the power output of 12 and 13. It should be obvious that the principle of operation of my invention will not be affected if 28 is a direct or alternating current generator supplying power to 29 since it is then also a load driven by 14. Similarly, the operation will not be affected if 12 and 13 are omitted and the load variations of 28 are absorbed by 25, this being known as a series buffer, nor will the operation be affected if 28 is omitted and the load variations on motors 12 and 13 are absorbed by 25, this being known as a parallel buffer. If 28 is a direct current generator connected to a direct current supply source 29, the fly-wheel 25 may be omitted and the operation of my invention will not be affected since the supply source 29 will absorb or supply the load variations on motors 12 and 13 and the same is true if 28 is an alternating current generator connected to an alternating current supply source, this type of set being known as a frequency converter set. It is obvious that by making suitable connections at the transformers 34 and 38 when 28 is a generator connected to a supply source, it is possible to hold a constant output on either source and have the other source absorb or supply the load variations of both sources.

To complete the description of the operation I will again assume that winding 36 is adjusted to require an input of 1000 kw. into 14, the load 28 requires 300 kw. input to machine 14, and the loads on motors 12 and 13 require 600 kw. input to them. As already described, the surplus 100 kw. will cause 14 to accelerate in speed and the fly-wheel 25 will absorb the 100 kw. but it is obvious that if this operating condition prevails for a sufficient interval of time the assumed safe speed of 1500 R. P. M. will be exceeded and damage might result. This is avoided however because the speed responsive switch 26 opens the circuit of the winding 24 at 1500 R. P. M. thus making winding 24 ineffective, and 10 will now supply 900 kw. of which 600 kw. goes to 12 and 13 and 300 kw. goes to drive 14 as a motor. The set however continues to run at 1500 R. P. M. since a decrease in speed will make winding 24 effective again causing 14 to accelerate in speed. Now assume that either the load 28 increases to 400 kw. or that the loads on motors 12 and 13 increase to 700 kw., then in either case the net input to 14 is just enough to drive 28, but the speed remains at 1500 R. P. M. since there is no tendency to decrease or increase the speed and 10 now supplies 1000 kw. Now assume that either the load 28 increases to 500 kw. or that the loads on motors 12 and 13 increase to 800 kw., then in either case the net input to 14 is unable to drive 28 and the speed of 14 decreases so that the fly-wheel 25 can supply the needed 100 kw. and the decreased speed permits the speed responsive switch 26 to reclose the circuit of winding 24. It is obvious that when the winding 24 is ineffective the set will function properly when motor operation is required from 14.

I will now describe the functioning of the set when winding 24 is ineffective at 1500 R. P. M. and there is a demand for generator operation of 14. I will assume that winding 36 is adjusted to require 1000 kw. input to 14, that 28 requires substantially no power to drive it and that 12 and 13 require 900 kw. As already described, the surplus 100 kw. will cause 14 to run at 1500 R. P. M. and the winding 24 will be ineffective. Now assume that the loads on motors 12 and 13 increase to 1100 kw., thus requiring 100 kw. output from 14 which can be obtained only by a speed decrease so that the fly-wheel 25 can supply the needed 100 kw. but the speed cannot be decreased till winding 24 is made effective. This is accomplished by the relay 41 which short circuits the speed responsive switch 26 when generator operation is required from 14. A brief description of the operation of relay 41 follows: The solenoid 44 carries the current supplied to winding 24, the solenoid 42 is energized directly from the source 10, and by choosing a suitable value of resistance 33 the current in solenoid 42 can be made to have the same lag behind its voltage as the lag of the current in solenoid 44 behind its voltage when the current in 44 corresponds to motor operation of 14. By making suitable connections for solenoids 42 and 44 their magnetic fluxes can be made to oppose each other and therefore the movable core 45 will be repelled from the stationary core 43 when 14 operates as a motor. It follows that when 14 operates as a generator the current in 44 reverses its relative instantaneous direction and 45 will be attracted to 43, thus short-circuiting the terminals 47 which short-circuits the speed responsive switch 26 and causes the winding 24 to become effective. It is obvious that safety and reliability of operation are obtained at all operating conditions and this will be true of all the described operating combinations the set can be used with.

Fig. 2 represents a modification of my invention in which similar parts to those in Fig. 1 are represented by similar numbers, and the additional parts are 48 representing a supplementary exciting winding in the regulating machine 19 and 9 representing a relatively high resistance in series with 48, while 49 represents a so-called locking device driven by 14 by means of the pulleys 50 and 51 and the belt 52. The locking device 49 consists of a rotating armature connected to the commutator 53, the armature being surrounded by a laminated stator 54 having no windings and serving merely as a return path for the armature flux. The commutator 53 is electrically connected to the resistance 32. Also, to the movable core 45 there is attached a lever 55 fulcrumed at 56 and operating a switch arm 57 which carries switch blades 58 fulcrumed at the stationary contacts 59 and making contact either with the upper or lower set of stationary contacts 60 and 61 respectively depending on the operation of relay 41.

A brief description of the operation follows: I will again assume that winding 36 is adjusted to maintain 1000 kw. output from 10, the desired maximum speed is 1500 R. P. M., but it may reach 1525 R. P. M. without danger and the speed responsive switch 26 is adjusted to open the circuit of winding 24 at 1525 R. P. M. The number of poles in the armature of 49, the connections thereof to resistance 32, and the ratio of the pulleys 50 and 51, are so chosen that with normal frequency at source 10 and with 14 operating at 1500 R. P. M. the armature of 49 will rotate at the same speed as the flux due to the low frequency currents supplied to it from 16, hence there will be no cutting of the flux by the armature conductors so that the armature acts as a pure resistance which being of a low value will act as a short-circuit across winding 24, thereby making 24 ineffective. At speeds above or below 1500 R. P. M. the armature conductors cut the magnetic flux, thus acting as a capacity or inductive reactance, and at speeds appreciably different from 1500 R. P. M. the armature resistance has increased sufficiently to allow winding 24 to become effective. Now assume the set running with a demand for motor operation of 14. The movable core 45 is repelled from the stationary core 43, the switch blades 58 make contact with contacts 61 as shown, the winding 48 is unexcited, the winding 24 is excited as in Fig. 1 and 14 operates as a motor as described in connection with Fig. 1. If there is a demand for generator operation of 14, then 45 is attracted to 43, the arm 57 moves up, the switch blades 58 make contact with contacts 60, thus causing windings 24 and 48 to be energized by approximately one-half of secondaries 36 and 39. The winding 48 is designed so that acting alone it makes 14 operate as a generator and the total flux of windings 24 and 48 to produce generator operation of 14 the same as that of winding 24 acting alone in Fig. 1. It is obvious that 14 will operate as a generator as described in connection with Fig. 1 and if changed conditions demand a motor operation from 14, then 45 is repelled from 43, winding 48 becomes ineffective and winding 24 becomes effective as in Fig. 1.

Now assume that the set runs with a motor operation of 14 such that a speed of 1500 R. P. M. is reached, then 49 acts as a pure resistance making winding 24 ineffective and the set operates at 1500 R. P. M. the same as in Fig. 1. If a demand for generator operation of 14 arises then 45 is attracted to 43 causing the switch blades 58 to make contact with contacts 60, thus exciting winding 48 which tends to make 14 operate as a generator, therefore causing a decrease in speed of 14 with resulting generator action of 14, and the speed decrease is sufficient to make 49 increase its resistance so that winding 24 is again effective and the set will function in the manner described. Now assume that the set operates at 1500 R. P. M. with a motor operation of 14 and there is a sudden and pronounced decrease in the frequency of 10, then the tendency will be for a proportionate decrease in speed with the winding 24 remaining ineffective since the frequency and speed of 49 would decrease in like proportion. This ideal operation will usually not prevail due to the inertia of the flywheel and the other rotating parts and the set will not decrease in speed as rapidly as the frequency, thus causing a disturbance in the relation between the speed and frequency of 49 so that it no longer acts to make winding 24 ineffective and the speed of 14 will tend to increase to dangerous values but this is prevented by the speed responsive switch 26 which opens the circuit of winding 24 at 1525 R. P. M. The set will run at 1525 R. P. M. and if a generator action is required from 14, the relay 41 operates to excite winding 48 and generator operation will result as described. It is obvious that safety and reliability of operation are obtained at all operating conditions.

While I have described my invention in connection with a single regulating machine employing separate windings to produce the desired voltage components, it will be obvious that it is possible and may be desirable to combine them into one exciting winding and it may also be desirable to interpose one or more exciters between the frequency changer and the regulating machine. Also while I have described a relay, switching mechanism, a speed responsive switch and a locking device, it will however be evident that other means producing similar results may be used. Accordingly I wish it understood that my invention is not to be limited to the exact means and connections shown and that such other modifications as fall fairly within the true spirit and scope of my invention are intended to be included within the scope of the appended claims.

What I claim as new and desire to secure by Letters Patent of the United States is:

1. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, a plurality of exciting windings for said commutator machine, means for impressing on one of said exciting windings a voltage whose magnitude is substantially directly proportional to the voltage of said secondary winding, and means for impressing on a second one of said exciting windings a voltage consisting of one component whose magnitude is substantially directly proportional to the voltage of said source and another component whose magnitude is substantially directly proportional to the magnitude of the current flowing between said source and said additional electrical apparatus.

2. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, a plurality of exciting windings for said commutator machine, means for impressing on one of said exciting windings a voltage whose magnitude is substantially directly proportional to the voltage of said secondary winding, means for impressing on a second one of said exciting windings a voltage consisting of one component whose magnitude is substantially directly proportional to the voltage of said source and another component whose magnitude is substantially directly proportional to the magnitude of the current flowing between said source and said additional electrical apparatus, and means responsive to a predetermined speed of said dynamo electric machine for making said second exciting winding substantially ineffective.

3. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, a plurality of exciting windings for said commutator machine, means for impressing on one of said exciting windings a voltage whose magnitude is substantially directly proportional to the voltage of said secondary winding, means for impressing on a second one of said exciting windings a voltage consisting of one component whose magnitude is substantially directly proportional to the voltage of said source and another component whose magnitude is substantially directly proportional to the magnitude of the current flowing between said source and said additional electrical apparatus, a normally closed switch in series with said second exciting winding, and means responsive to speeds of said dynamo electric machine exceeding a predetermined value for opening said switch.

4. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, a plurality of exciting windings for said commutator machine, means for impressing on one of said exciting windings a voltage whose magnitude is substantially directly proportional to the voltage of said secondary winding, means for impressing on a second one of said exciting windings a voltage consisting of one component whose magnitude is substantially directly proportional to the voltage of said source and another component whose magnitude is substantially directly proportional to the magnitude of the current flowing between said source and said additional electrical apparatus, a normally closed switch in series with said second exciting winding, means responsive to speeds of said dynamo electric machine exceeding a predetermined value for opening said switch, and means responsive to a predetermined relationship between the instantaneous directions of the voltage of said source and of the voltage impressed on said second exciting winding for short-circuiting said switch.

5. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, at least two exciting windings in said commutator machine, a transformer having its primary winding connected to said source, a second transformer having its primary winding connected in series with said additional electrical apparatus to said source, means for impressing on one of said exciting windings a voltage whose magnitude is substantially directly proportional to the voltage of said secondary winding, and means connected between the secondary windings of said transformers and the second exciting winding for impressing on the latter a voltage whose magnitude is substantially directly proportional to the vector sum of the respective voltages of the secondary windings of said transformers.

6. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, at least two exciting windings in said commutator machine, means for impressing on one of said exciting windings a voltage whose magnitude is substantially directly proportional to the voltage of said secondary winding, a commutated armature winding connected in parallel with the second exciting winding, means for driving said commutated armature winding at speeds which are substantially directly proportional to the speeds of said dynamo electric machine, and means for impressing on the second exciting winding and on the commutator of said commutated armature winding a voltage consisting of one component whose magnitude is substantially directly proportional to the voltage of said source and another component whose magnitude is substantially directly proportional to the magnitude of the current flowing between said source and said additional electrical apparatus.

7. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, at least two exciting windings in said commutator machine, means for impressing on one of said exciting windings a voltage whose magnitude is substantially directly proportional to the voltage of said secondary winding, means for impressing on the second exciting winding a voltage consisting of one component whose magnitude is substantially directly proportional to the voltage of said source and another component whose magnitude is substantially directly proportional to the magnitude of the current flowing between said source and said additional electrical apparatus, a normally closed switch in series with the second exciting winding, means responsive to speeds of said dynamo electric machine exceeding a predetermined value for opening said switch, two relatively movable magnetizable cores, a winding for one of said cores connected to said source, a winding for the other of said cores connected to be energized by a current which is substantially directly proportional to the current flowing in the second exciting winding, two normally open contacts respectively connected to opposite ends of said switch, and means actuated by the movable core and adapted to short-circuit said contacts at predetermined relative positions of said cores.

8. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, a plurality of exciting windings for said commutator machine, a transformer having its primary winding connected to said source, a second transformer having its primary winding connected in series with said additional electrical apparatus, connecting means between the secondary windings of said transformers to give a vector resultant voltage of the respective voltages induced in the secondary windings of said transformers, means for impressing on one of said exciting windings a voltage whose magnitude is directly proportional to the voltage of said secondary winding, and means responsive to a predetermined relationship between the relative instantaneous directions of the voltage of said source and of said vector resultant voltage for impressing on a second of said exciting windings the vector resultant voltage of predetermined portions of the secondary windings of said transformers, and responsive to the opposite relationship between the instantaneous directions of the voltage of said source and of said vector resultant voltage for impressing on a second and third of said exciting windings the vector resultant voltage of different predetermined portions of the secondary windings of said transformers.

9. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, a plurality of exciting windings for said commutator machine, a commutator type frequency changer provided with a winding connected to collector rings, means for rotating said frequency changer at speeds which are directly proportional to the speeds of said dynamo electric machine, connecting means between one of said exciting windings and said secondary winding, connecting means between a second one of said exciting windings and the commutator of said frequency changer, a transformer having its primary winding connected to said source, a second transformer having its primary winding connected in series with said additional electrical apparatus, two relatively movable magnetizable cores, a winding for one of said cores connected to said source, a winding for the other of said cores, two sets of stationary contacts, a set of movable blades actuated by the movable core and adapted to make contact with one set of said stationary contacts at one predetermined position of the movable core and to make contact with the other set of said stationary contacts at a different predetermined position of the movable core, and connecting means adapted to connect predetermined portions of the secondary windings of said tranformers in series with said winding for the other of said cores to the collector rings of said frequency changer when said set of movable blades is in contact with one of said sets of stationary contacts and connect different predetermined portions of the secondary windings of said transformers in series with said winding for the other of said cores to the collector rings of said frequency changer and connect a third of said exciting windings to the commutator of said frequency changer when said set of movable blades is in contact with the other of said sets of stationary contacts.

10. In combination, an alternating current dynamo electric machine comprising primary and secondary windings, a source of alternating current connected to said primary windings, additional alternating current electrical apparatus connected to said source, a commutator machine electrically connected to said secondary windings, means to rotate said commutator machine, at least two exciting windings in said commutator machine, a fly-wheel driven by said dynamo electric machine, a normally closed switch, means responsive to speeds of said dynamo electric machine exceeding a predetermined value for opening said switch, a commutator type frequency changer rotated by said dynamo electric machine, said frequency changer being provided with a winding connected to collector rings, connecting means for energizing one of said exciting windings from said commutator machine, means for connecting the other of said exciting windings in series with said switch to the commutator of said frequency changer, a transformer having its primary winding connected to said source, a second transformer having its primary winding connected in series with said additional electrical apparatus, two relatively movable magnetizable cores, a winding for one of said cores connected to said source, a winding for the other of said cores, means for connecting the secondary windings of said transformers in series with said winding for the other of said cores to the collector rings of said frequency changer, a pair of normally open contacts respectively connected to opposite ends of said switch, and means actuated by the movable core and adapted to short-circuit said pair of contacts at a predetermined position of the movable core.

11. In combination, an alternating current dynamo electric machine comprising primary and secondary windings, a source of alternating current connected to said primary windings, additional alternating current apparatus connected to said source, a commutator type dynamo electric machine electrically connected to said secondary windings, means for rotating said commutator machine, exciting windings for said commutator machine, and means for energizing said exciting windings to produce an exciting flux consisting of one component whose magnitude is substantially directly proportional to the voltage of said secondary winding, and a second component whose magnitude is substantially directly proportional to the voltage of said source, and a third component whose magnitude is substantially directly proportional to the current flowing between said source and said additional alternating current apparatus.

12. In a regulating system for alternating current apparatus, the combination of a source of alternating current connected to said apparatus, a commutator type dynamo electric machine for regulating said apparatus, an exciting winding for said commutator type dynamo electric machine, additional alternating current apparatus connected to said source, and means for impressing on said exciting winding a voltage consisting of one component whose magnitude is substantially directly proportional to the voltage of said source and another component whose magnitude is substantially directly proportional to the magnitude of the current flowing between said source and said additional alternating current apparatus.

13. In a regulating system for alternating current apparatus, the combination of a source of alternating current connected to said apparatus, a commutator type dynamo electric machine for regulating said apparatus, an exciting winding for said commutator type dynamo electric machine, additional alternating current apparatus connected to said source, a transformer having its primary winding connected to said source, a second transformer having its primary winding connected in series with said additional alternating current apparatus, and connecting means for impressing on said exciting winding a voltage whose magnitude is substantially directly proportional to the vector sum of the respective voltages of the secondary windings of said transformers.

14. In a regulating system for alternating current apparatus, the combination of a source of alternating current connected to said apparatus, a commutator type dynamo electric machine for regulating said apparatus, an exciting winding for said commutator type dynamo electric machine, additional alternating current apparatus connected to said source, a speed responsive switch connected in series with said exciting winding, means for rotating said commutator machine and speed responsive switch at speeds which are directly proportional to each other, means for impressing on said exciting winding a voltage consisting of one component whose magnitude is substantially directly proportional to the voltage of said source and another component whose magnitude is substantially directly proportional to the magnitude of the current flowing between said source and said additional alternating current apparatus, and means responsive to a predetermined relationship between the instantaneous directions of the voltage of said source and of the voltage impressed on said exciting winding for short-circuiting said speed responsive switch.

15. In a regulating system for an asynchronous machine, the combination of a source of alternating current connected to the primary winding of said machine, a commutator type dynamo electric machine concatenated with the secondary winding of said asynchronous machine, an exciting winding for said commutator type dynamo electric machine, additional alternating current apparatus connected to said source, means for rotating said commutator type dynamo electric machine, a commutated armature winding connected in parallel with said exciting winding, means for rotating said commutated armature winding at a speed which is substantially directly proportional to the speed of said asynchronous machine, and means for impressing on said exciting winding and on said commutated armature winding a voltage consisting of one component whose magnitude is substantially directly proportional to the voltage of said source and another component whose magnitude is substantially directly proportional to the magnitude of the current flowing between said source and said additional alternating current apparatus.

16. In a regulating system for alternating current apparatus, the combination of a source of alternating current connected to said apparatus, a commutator type dynamo electric machine for regulating said apparatus, two exciting windings for said commutator type dynamo electric machine, additional alternating current apparatus connected to said source, a transformer having its primary winding connected to said source, a second transformer having its primary winding connected in series with said additional alternating current apparatus, connecting means between the secondary windings of said transformers to give the vector resultant voltage of their respective voltages, and means responsive to a predetermined relationship between the instantaneous directions of the voltage of said source and of said vector resultant voltage for impressing on one of said exciting windings the vector resultant voltage of predetermined portions of the secondary windings of said transformers, and responsive to the opposite relationship between the instantaneous directions of the voltage of said source and of said vector resultant voltage for impressing on both of said exciting windings the vector resultant voltage of different predetermined portions of the secondary windings of said transformers.

In witness whereof, I have hereunto set my hand this 3rd day of January, 1930.

WALTER SEIZ.